United States Patent
Shaw

(10) Patent No.: US 9,655,134 B2
(45) Date of Patent: *May 16, 2017

(54) MANAGEMENT OF VOICE COMMUNICATIONS OVER LONG TERM EVOLUTION NETWORKS

(71) Applicant: AT&T Intellectual Property I,L.P., Atlanta, GA (US)

(72) Inventor: Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,366

(22) Filed: Jun. 8, 2015

(65) Prior Publication Data

US 2015/0271835 A1 Sep. 24, 2015

Related U.S. Application Data

(63) Continuation of application No. 13/711,835, filed on Dec. 12, 2012, now Pat. No. 9,055,554.

(51) Int. Cl.
*H04W 72/00* (2009.01)
*H04W 72/08* (2009.01)
*H04W 76/00* (2009.01)
*H04W 76/02* (2009.01)
*H04W 24/10* (2009.01)
*H04W 76/04* (2009.01)

(52) U.S. Cl.
CPC ......... *H04W 72/087* (2013.01); *H04W 24/10* (2013.01); *H04W 76/00* (2013.01); *H04W 76/022* (2013.01); *H04W 76/041* (2013.01)

(58) Field of Classification Search
CPC ...................................................... H04W 28/24
USPC ........................... 455/450, 451, 452.1, 452.2
See application file for complete search history.

(56) References Cited

U.S. PATENT DOCUMENTS

| | | |
|---|---|---|
| 6,937,566 B1 | 8/2005 | Forslow |
| 2003/0009580 A1 | 1/2003 | Chen et al. |
| 2008/0132268 A1 | 6/2008 | Choi-Grogan et al. |
| 2008/0194266 A1 | 8/2008 | Islam et al. |
| 2009/0213749 A1 | 8/2009 | Han |
| 2012/0039213 A1* | 2/2012 | Cheng ................. H04W 76/022 370/254 |
| 2012/0069763 A1 | 3/2012 | Zhao et al. |
| 2012/0314568 A1 | 12/2012 | Tan et al. |

(Continued)

*Primary Examiner* — Christopher M Brandt
(74) *Attorney, Agent, or Firm* — Baker & Hostetler LLP

(57) ABSTRACT

A first network device in a network, such as an LTE network, configured to establish a default bearer between a node and the first network device. The first network device may transmit a first communication type between the first network device and the node over the a default bearer and receive a service request requesting the establishment of a dedicated bearer for the transmission of a second communication type between the first network device and the node, the service request requesting that the dedicated bearer have a quality of service higher than the quality of service of the default bearer. The first network device may transmit the second type of communication between the first network device and the node over the default bearer, establish the dedicated bearer, and then switch the transmission of the second type of communication from the default bearer to the dedicated bearer.

20 Claims, 13 Drawing Sheets

(56) References Cited

U.S. PATENT DOCUMENTS

| | | |
|---|---|---|
| 2013/0077503 A1 | 3/2013 | Chaudhuri et al. |
| 2013/0170350 A1 | 7/2013 | Sarkar et al. |
| 2014/0066084 A1 | 3/2014 | Paladugu |
| 2014/0068064 A1* | 3/2014 | Anchan ............... H04W 4/001 709/224 |
| 2014/0213276 A1 | 7/2014 | Breitbach et al. |
| 2014/0233380 A1 | 8/2014 | Kim et al. |

* cited by examiner

MANAGEMENT OF VOICE COMMUNICATIONS OVER LONG TERM EVOLUTION NETWORKS

CROSS-REFERENCE TO RELATED APPLICATIONS

This application is a continuation of U.S. patent application Ser. No. 13/711,835, filed Dec. 12, 2012, the contents of which are incorporated by reference herein in its entirety.

TECHNICAL FIELD

The technical field generally relates to wireless communications and more specifically to the setup of dedicated bearers and default bearers in a long term evolution LTE network for the transmission of voice communications over LTE networks (VoLTE).

BACKGROUND

Long Term Evolution (LTE) is a wireless communication standard for high-speed data transmission for mobile phones and data terminals. In order to support voice calls, Voice Over LTE (VoLTE) was developed. VoLTE is based on the IP Multimedia Subsystem (IMS) network and enables voice service to be delivered as data within the LTE network. In current wireless networks, such as LTE networks, voice data is successfully transmitted over the network only if the requested resources are available at the moment a voice service request is received by a core wireless network. If the requested resources are not available, the service request is denied and the transmission does not go through.

SUMMARY

According to an embodiment, a first network device in a network, such as an LTE network, may be configured to establish a default bearer between a node and the first network device. The default bearer being associated with a first Access Point Name (APN) residing on a wireless transmit/receive unit (WTRU), the node wirelessly interfacing with the WTRU, and the default bearer having a quality of service. The first network device may transmit a first communication type between the first network device and the node over the default bearer; receive, at the first network device, a service request, the service request requesting the establishment of a dedicated bearer for the transmission of a second communication type between the first network device and the node, the service request requesting that the dedicated bearer have a quality of service higher than the quality of service of the default bearer, the service request originating from a second APN residing on the WTRU; transmit the second type of communication between the first network device and the node over the default bearer; establish the dedicated bearer; and switch, after the dedicated bearer is established, the transmission of the second type of communication between the first network device and the node from the default bearer to the dedicated bearer.

According to another embodiment, the dedicated bearer may be established after transmitting the second type of communication between the first network device and the node over the default bearer.

In another embodiment, the first network device may determine, prior to transmitting the second type of communication between the first network device and the node over the default bearer, that the required network resources to establish the dedicated bearer are not available. In this instance, in order to establish the dedicated bearer, the first device may: 1) determine, after transmitting the second type of communication between the first network device and the node over the default bearer, whether the required network resources are available to establish the dedicated bearer; and 2) establish the dedicated bearer when the required network resources are available.

In an embodiment, a method may include providing a message for a network device, wherein based on the message a default bearer is established between a node and the network device, the default bearer being associated with a first Access Point Name (APN) of a wireless transmit/receive unit (WTRU), the node wirelessly interfacing with the WTRU, the default bearer having a quality of service. A first communication type may be transmitted between the network device and the node over the default bearer. A service request may be provided to the network device, in which the service request requests the establishment of a dedicated bearer for the transmission of a second communication type between the network device and the node, the service request requesting that the dedicated bearer have a quality of service higher than the quality of service of the default bearer, the service request originating from a second APN associated with the WTRU. After establishing a dedicated bearer, the second type of communication may be transmitted between the network device and the node from the default bearer to the dedicated bearer.

DETAILED DESCRIPTION OF ILLUSTRATIVE EMBODIMENTS

Figure 1A:
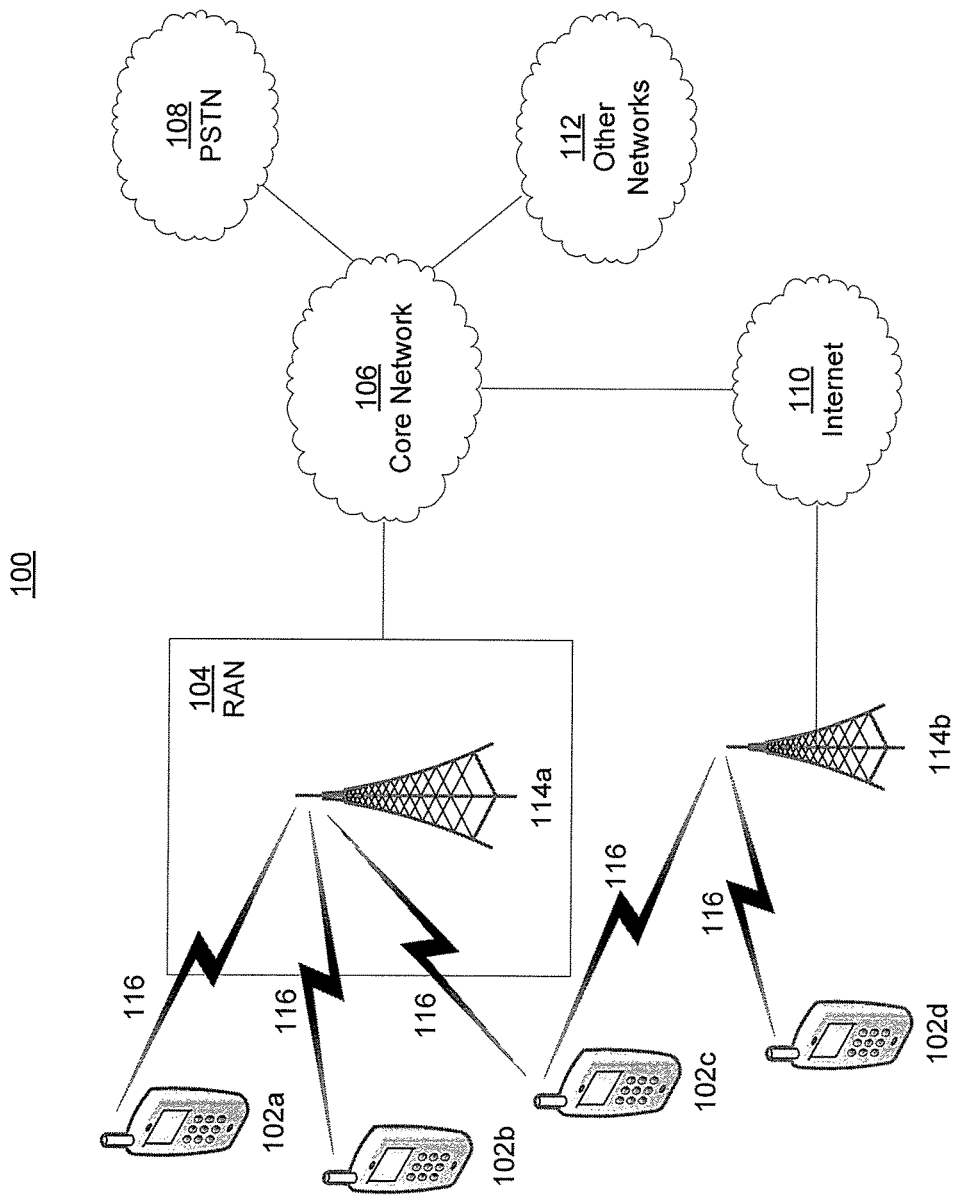
FIG. 1A is a system diagram of an example communications system in which VoLTE methods and systems may be implemented.

FIG. 1A is a diagram of an example communications system 100 in which VoLTE systems and methods as disclosed herein may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
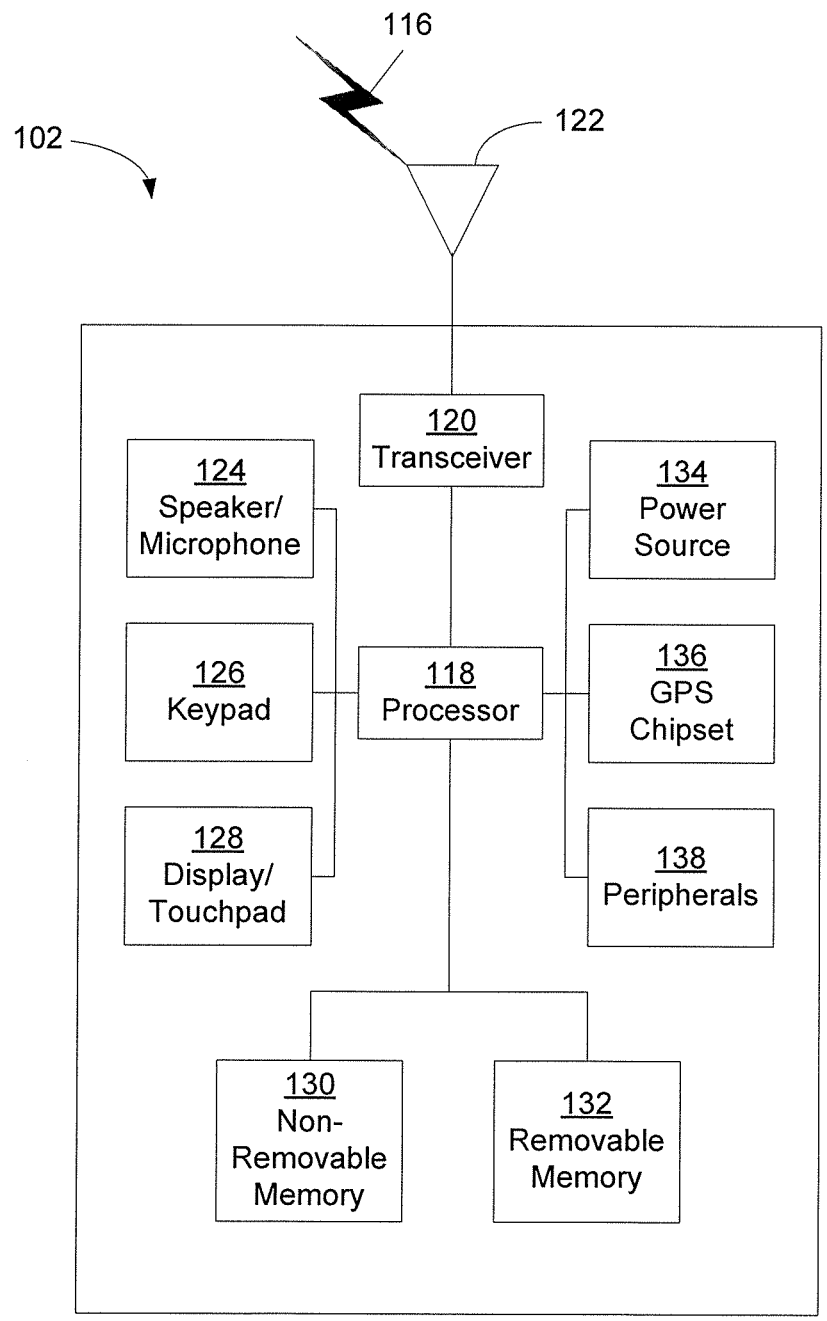
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
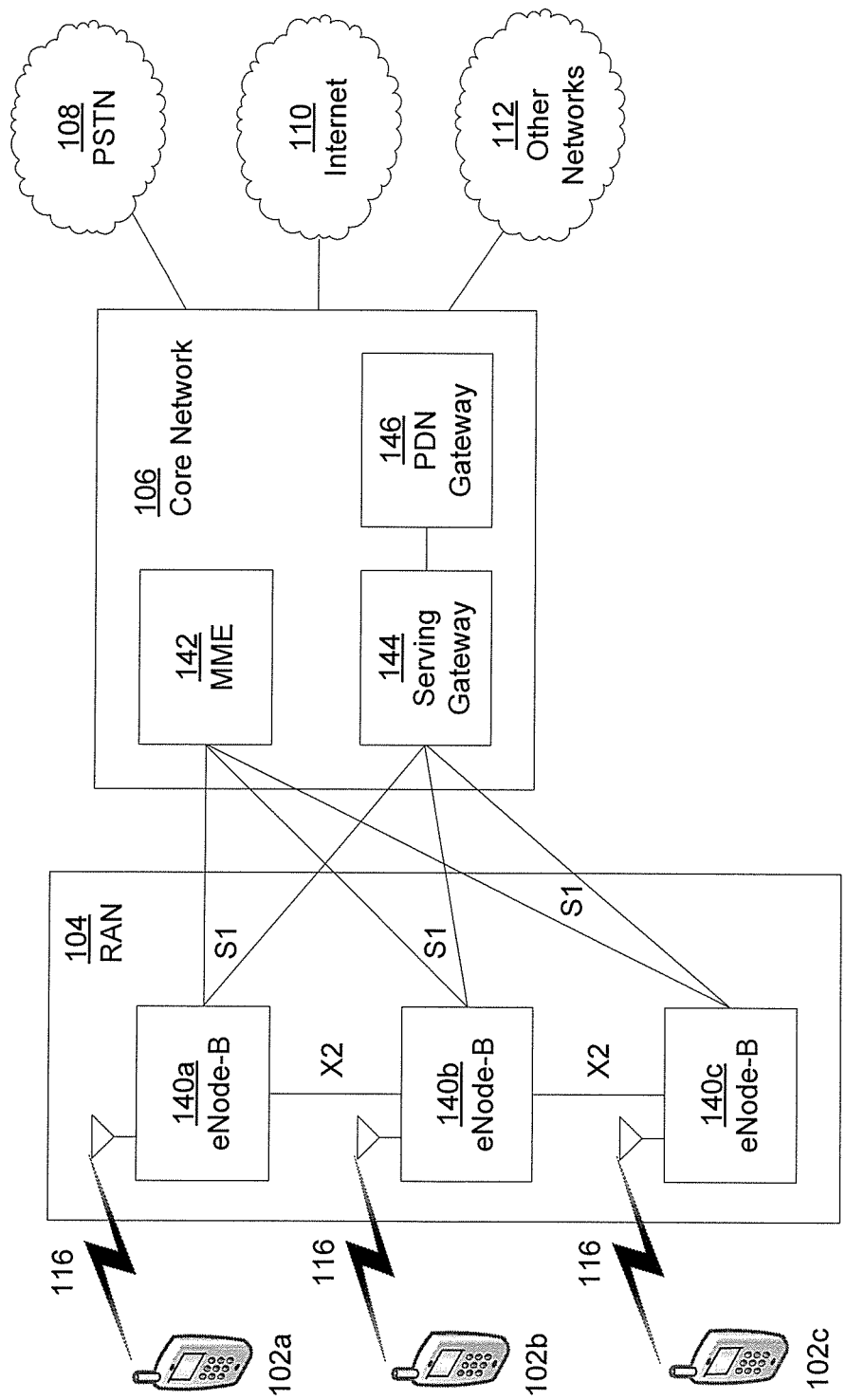
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
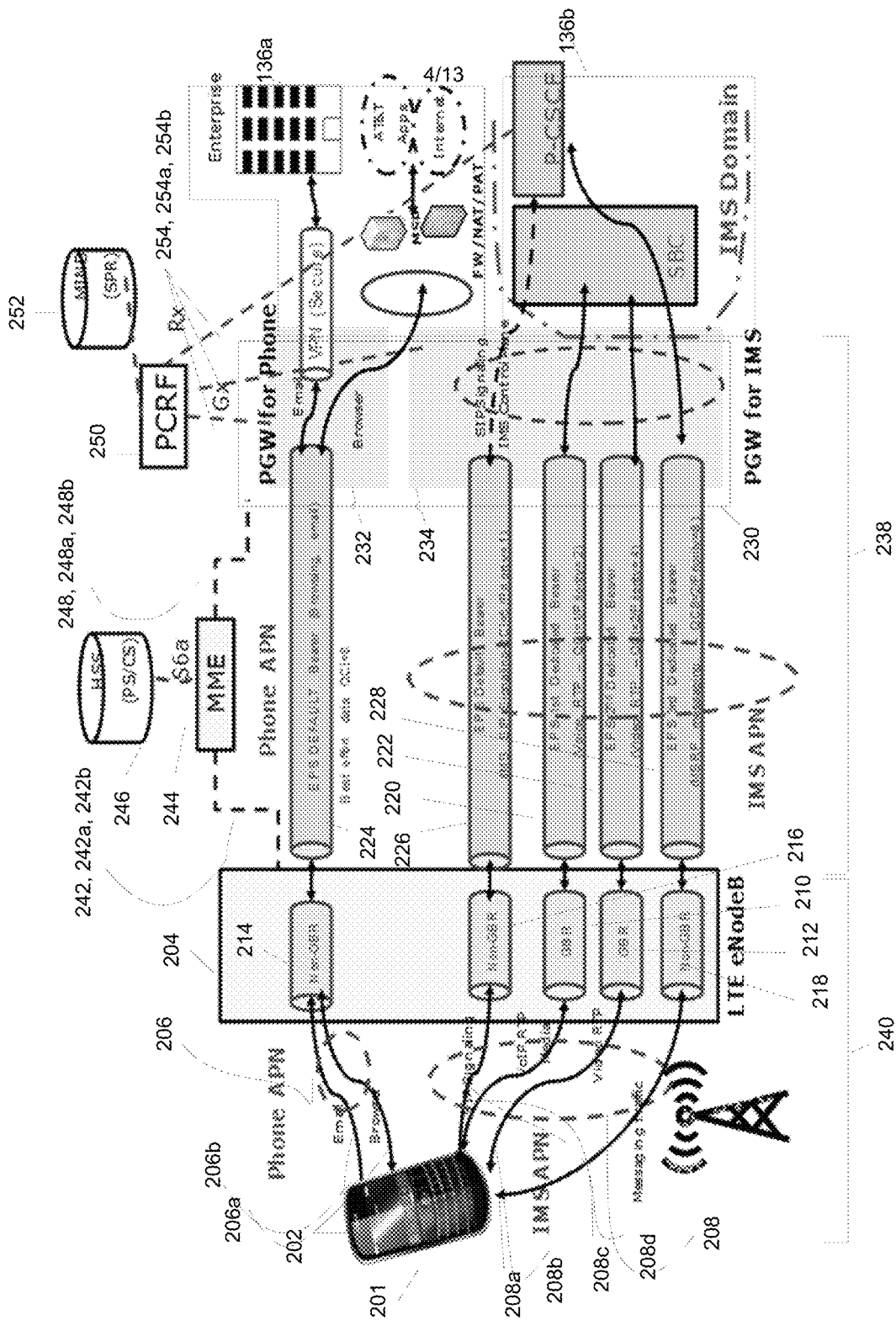
FIG. 2 illustrates an exemplary LTE communication network.

FIG. 2 illustrates an exemplary LTE communication network 200, which is an alternative embodiment of communication system 100 that supports the implementation of the VoLTE systems and methods as disclosed herein. LTE network 200 may include one or more: WTRUs, such as WTRU 202; base stations, such as enodeB 204; a Mobility Management Entity (MME) 244; a Home Subscriber Server (HSS) 246; bearers 220-228; a gateway 230; a Policy and Charging Rules Function (PCRF) 250; a Master IT and Network Database (MIND) 252; a PSTN 108, such as telephone network 236a; another network 112, such as IMS domain 136b; and the internet (not shown). MIND 252 is responsible for providing subscriber information to other network elements. The subscriber information, for example, can be used for routing messages, for the validation of services, and for enabling other data services. WTRU 202 and enodeB 204 may comprise a radio network 240. HSS 246, MME 246, bearers 220-228, MIND 252, PCRF 250 and gateway 230 may comprise network devices in a core wired network 238.

WTRU 202 may communicate wirelessly with enodeB 204 through at least one Access Point Name (APN) pre-provisioned on the WTRU and stored in memory of the WTRU (such as non-removable memory 130 and removable memory 132 from FIG. 1B). An APN specifies the external networks that a WTRU can access and may define one or more of a type of IP address to use, which security mechanisms to invoke, and which fixed-end connections to use. The APNs available to a WTRU are specified as part of the subscriber account. A mobile station can have access to more than one APN, though the specific APN used depends on the type of data being exchanged between the WTRU and a network.

In an embodiment, WTRU 202 may contain a first APN 206 and a second APN 208. First APN 206 may be a phone APN while second APN 208 may be an IMS APN. First APN 206 and second APN 208 may each allow multiple applications residing on WTRU 202 to connect with node 204 via connections 206a, 206b and 208a-208d, respectively. Each of connections 206a, 206b, and 208a-208d may support a different type of communication type. Connection 206a may be an email connection while connection 206b may be a browser connection. Connection 208a may be a Session Initiation Protocol (SIP) signaling connection, connection 208b may be a Voice over IP (VoIP) Real-time Transport Protocol (RTP) media connection, connection 208c may be a video RTP connection, and connection 208d may be a messaging traffic connection. WTRU 202, APN 206, APN 208, and node 204 may collectively be referred to as radio network 240.

Service requests 242 may be a type of control information generated by WTRU 202 and APN 206 or APN 208 in response to a user input. Exemplary user inputs may be user inputted data and/or voice communications. As will be explained further below with respect to FIG. 3, a service request 242 details specific network 200 resources requested by APN 208 to successfully transmit the user inputted data and/or voice communications. Once generated, the service request 242 may be transmitted to Node 204. Node 204 may then transmit the service requests 242 received from APN 206 and APN 208 to the core wired network 238 where it may be received by MME 244.

Upon receipt, MME 244, in cooperation with HSS 246, which is connected to MME 244, may receive service requests, authenticate the WTRU associated with the user inputs, and, after authentication, transmit an authorized service request 248 to gateway 230. HSS 246 may be a database containing subscription-related information related to a plurality of users (for example user profiles and user account information).

PCRF 250 and MIND 252, which is connected to PCRF 250, may be connected to and enhance control information with gateway 230 and/or IMS domain 336a. MIND 252 may store user profiles and information relating to user subscription levels. PCRF 250 and MIND 252 may receive control information, such as the authorized service request 248, from gateway 230 and, in real-time, determine policy rules relating to the user and/or WTRU associated with the authorized service request 248. Exemplary policy rules may include Quality of Service (QoS) levels and features available to specific user based on that user's profile and/or subscription level. The PCRF may communicate the policy information to the gateway 230 and/or network 136 via policy control signals 254.

Gateway 230, in cooperation with node 204, establishes one or more of exemplary bearers 220-228 based on one or both of authorized service requests 248 and policy control signals 254. Once established, gateway 230 may send/receive data with node 204 via one or more of bearers 220-228. Exemplary bearers 220-228 may include: guaranteed bit rate (GBR) connections 210, 212 for Evolved Packet System (EPS) first dedicated bearer 220 (for voice RTP) and EPS 2nd Dedicated bearer 222 (for video RTP), respectively; and non-guaranteed bit rate (non-GBR) links 214, 216, 218 with EPS default bearer 224 (for browsing and email) EPS default bearer 226 (for IMS signaling), and 3rd EPS dedicated bearer 228 (for Message Session Relay Protocol (MSRP) messaging) respectively.

Gateway 230 may include two gateways: P gateway 232 and P gateway 234. P gateway 232 may be associated with the phone APN (first APN 206) while P gateway 234 may be associated with the IMS APN (second APN 208). P gateway 232 may set up EPS default bearer 224 and P gateway 232 may set up EPS 1st Dedicated bearer 220 and EPS 2nd Dedicated bearer 222, EPS default bearer 226, and 3rd EPS dedicated bearer 228.

Once one or more of bearers 220-228 are set up, gateway 230 may pass information between at least one of telephone network 136a or IMS domain 136b and one or more of bearers 220-228. The IMS domain 136b may contain network elements corresponding to the IMS APN 208. The phone domain 136a may contain network elements associated with the phone APN 206. One or more of bearers 220-228, gateway 230, network 236, MME 244, HSS 246, PCRF 250, and MIND 252 may collectively be referred to as the EPS network 238.

Figure 3A:
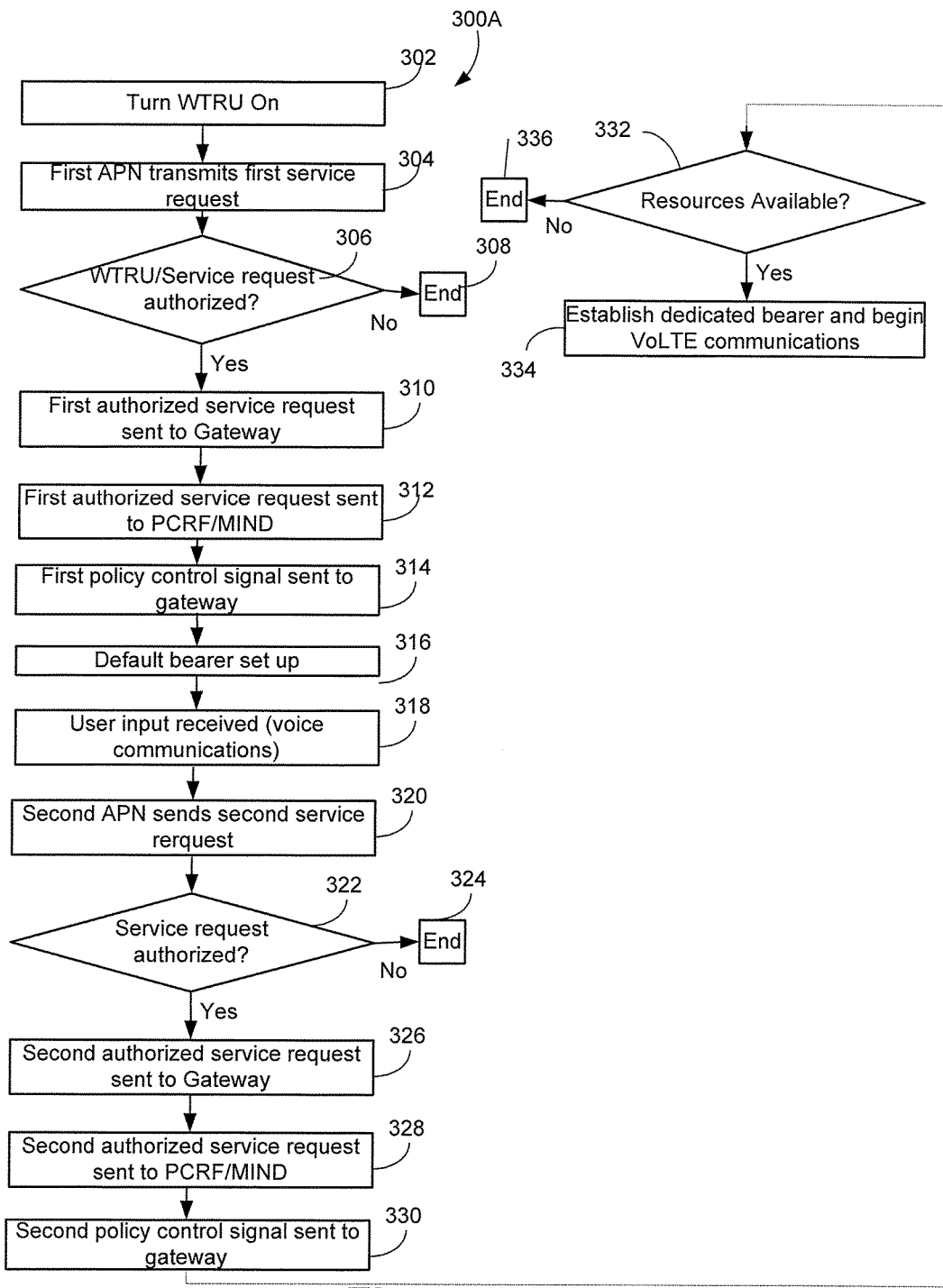
FIGS. 3A, 3B, and 3C illustrate exemplary operations of the LTE network

FIG. 2 and FIG. 3A illustrate an exemplary operation 300A of network 200 according to an embodiment. In block 302, WTRU 202 is turned on. In block 304, APN 206 sends a first control information service request 242a. As APN 206 may be the first APN utilized by the mobile device and can service a variety of low QoS applications via connections 206a, 206b, APN 206 may be referred to as a generic APN. Further, since APN 206 can service a variety of lower QoS applications; first service request 242a may request a non-GBR connection, such as link 214, and a bearer able to transmit information that is suited for a GBR connection. In block 306, the MME 244, in cooperation with the HSS 246, receives the service request 242a and attempts to authenticate the first service request 242a and/or WTRU 202. If the first service request 242a and/or WTRU 202 is not authenticated, the operation 300 continues onto block 308 where operation 300A may end. If the service request 242a and/or WTRU 202 is authenticated, MME 244 prepares and sends a first authorized service request 248a to gateway 230 in block 310. In block 312, the gateway 230 may share the first authorized service request 248a to the PCRF 250 and MIND 152. In block 314, the gateway 230 may receive a first policy control signal 248a is response. In block 316, the gateway 214 may set up bearer 224 in response to the received first authorization request 248a and/or the first policy control signal 248a. As bearer 224 may be established before bearers 220, 222, 226, and 228 and is associated with generic APN 208, bearer 224 may be described as a default bearer. Default Bearer 224 is connected to a non-GBR link 214 and may transmit information between WTRU 202 and the wired network 236 that does not preferably sent using a high quality of service (QoS) connection, such as, for example, a Short Message Service (SMS) message, internet browser track, or information initiating a telephone call.

Continuing with FIGS. 2 and 3A, in block 318 WTRU 202 may receive a user input 201 in the form of a voice input (e.g., the user speaking into WTRU 202). In block 320, in response to the user input 201, APN 208 may send a second service request 242b through node 208 to MME 244. The service request 242b may be sent in order to establish VoIP communications in LTE communication network 200, which may be referred to as VoLTE communications. APN 208 may be a designated APN for VoLTE communications and may therefore be referred to as a designated APN. The second service request 242b may detail the specific resources requested by APN 208 to successfully transmit the voice information, such as requested radio network 240 and core wired network 238 resources. For example, in order to support VoLTE communications, the second service request 242b may requested the establishment of a dedicated bearer with a high QoS (such as, for example, bearer 220), a specific connection (such as, for example, connection 208c) and a GBR link (such as, for example, link 210).

In block 322 of FIG. 3A, upon receipt of the second service request 242b, MME 244 in cooperation with the HSS 246 receives the second service request 242b and attempts to authenticate second service request 242b and/or WTRU 202. If the second service request 242b and/or WTRU 202 are not authenticated, operation 300A may proceed to block 324 where it may end. If the user is authenticated, operation 300A may proceed to block 326 where a second authorized service request 248b is sent to gateway 230. The second service request 248b may detail the specific resources requested by APN 208, such as those radio network 240 and core wired network 238 resources requested to successfully transmit VoLTE communications. For example, the second service request 242b may request the establishment of a dedicated bearer with a high QoS (such as, for example, bearer 220), a VoIP connection (such as, for example, connection 208c) and a GBR link (such as, for example, link 210). In block 328, the gateway 230 may share the second authorized service request 248b with the PCRF 250 and/or MIND 252. In block 330, the PCRF may send a second policy control signal 248b to gateway 230 is response. In block 332, the gateway 230 may determine if the resources are currently available to meet the requests of the second authorized service request 248b and the policy control signal 254b. In an embodiment, gateway 230 may only consider the availability of resources requested by the service request in block 332 and not information about the call itself (for example, a personal call as opposed to a business call or an emergency call) or the WTRU 202.

If the requested resources are not available when the second authorization request is received, operation 300A proceeds to block 336. In block 336, second the service request 242b from APN 208 may be denied. If a service request is denied, a user may manually retry by, for example, resubmitting the user input 201 at block 318 until a service request for VoLTE communications is granted. If a service request is denied and a dedicated bearer is not set up, a user input 201 may not result in the transmission of the user's voice information but the user may not be otherwise informed of the denial. Similarly, gateway 230 may not be able to inform the user when the requested resources become available, forcing the user to repeatedly reenter the user input 201 until a service request for VoLTE communications is granted.

If the resources are available, operation 200 may proceed to block 334. In block 334, the second service request 242b from APN 208 may be granted and the dedicated bearer 220, which fulfills the requests within the second service request 242b, may be set up. As bearer 220 may be established in accordance with the requests contained in the second service request 242b and may be dedicated to the transmission of VoIP communications, bearer 220 may be referred to as a dedicated bearer. Dedicated Bearer 220 may be connected to GBR link 210 and transmit information between WTRU 202 and the wired network 236 that is preferably sent using a high quality of service (QoS) connection, such as, for example, VoIP communications.

According to an exemplary embodiment, gateway 230 may receive a plurality of authorized service requests 248 originating from a plurality of service requests 242 from WTRU 202. Upon receipt, the core wired network 238 may not have any knowledge of the current ability of the wired network to grant its request. Thus, when core wired network 238 resources are available or become available, the core wired network 238 (and in particular gateway 230) may grant the plurality of authorized service requests 248 and set up a dedicated bearer on a "first come, first served" basis.

Figure 3B:
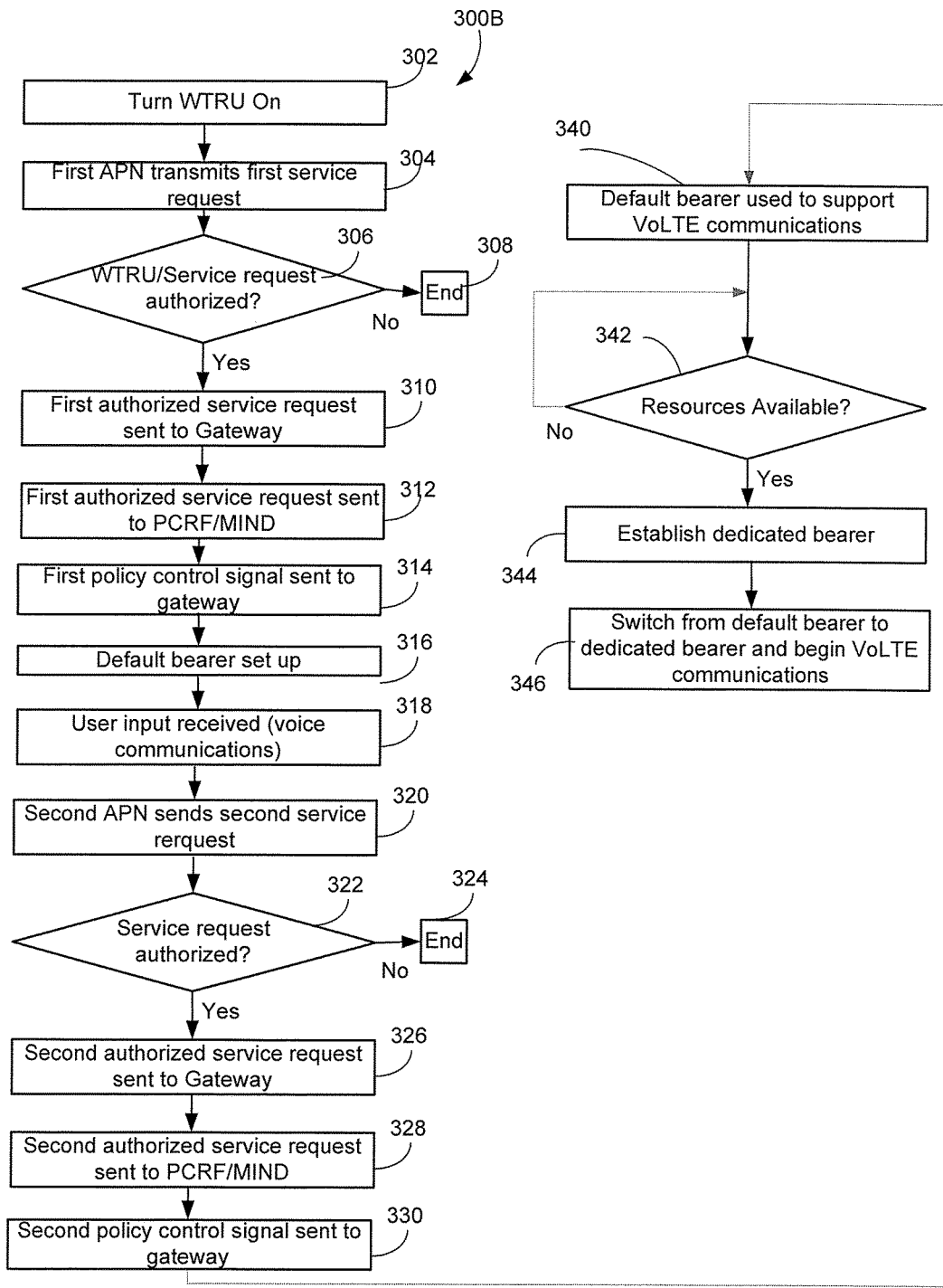

FIG. 3B illustrates another exemplary operation 300B of network 200 according to an embodiment. Blocks 302-330 of operation 300B are described above in connection with FIG. 3A. From block 330, operation 300 proceeds to block 340. In block 340, gateway 230 may, upon receipt of the second authorized service request 248b, instantaneously begin using default bearer 124 to transmit/receive VoLTE communications. Gateway 230 may begin using default bearer 124 to support VoLTE communications before determining whether the network resources are available to grant the second authorized service request 248b by establishing a dedicated bearer. Default bearer 124 may be used to transmit VoLTE traffic even though it does not have a high enough QoS to fulfill that of the service request 242b. Accordingly, while the VoLTE communications being transmitted over the default bearer 224 may suffer from poor QoS as compared to the QoS offered by a dedicated bearer, the VoLTE communications may begin flowing instantaneously, regardless of the core wired network's 238 ability to establish a dedicated bearer in response to the second service request 242b. After the default bearer 124 begins supporting VoLTE communication, operation 300B may continue onto block 342.

In block 342, the gateway 230 may determine if the resources are currently available to establish a bearer which satisfies the requests of the second authorized service request 248b and the policy control signal 254b. If the requested resources are not available when the second authorization request 242b is received, gateway 230 may repeat block 342. If the resources are available, operation 300B grant the request and proceed to block 344.

In block 344, the second service request 242b from APN 208 may be granted and the dedicated bearer 220, which fulfills the requests contained within the second service request 242b, may be set up. Dedicated bearer 220 may be established in accordance with the requests contained in the second service request 242b and may be dedicated to the transmission of VoLTE communications. Dedicated Bearer 220 may be connected to GBR link 210 and transmit information between WTRU 202 and the wired network 236 that requests a high quality of service (QoS) connection, such as VoLTE communications. Once dedicated bearer 220 has been set up, the VoLTE communications may be switched from default bearer 224 to dedicated bearer 220 in block 346.

Figure 3C:
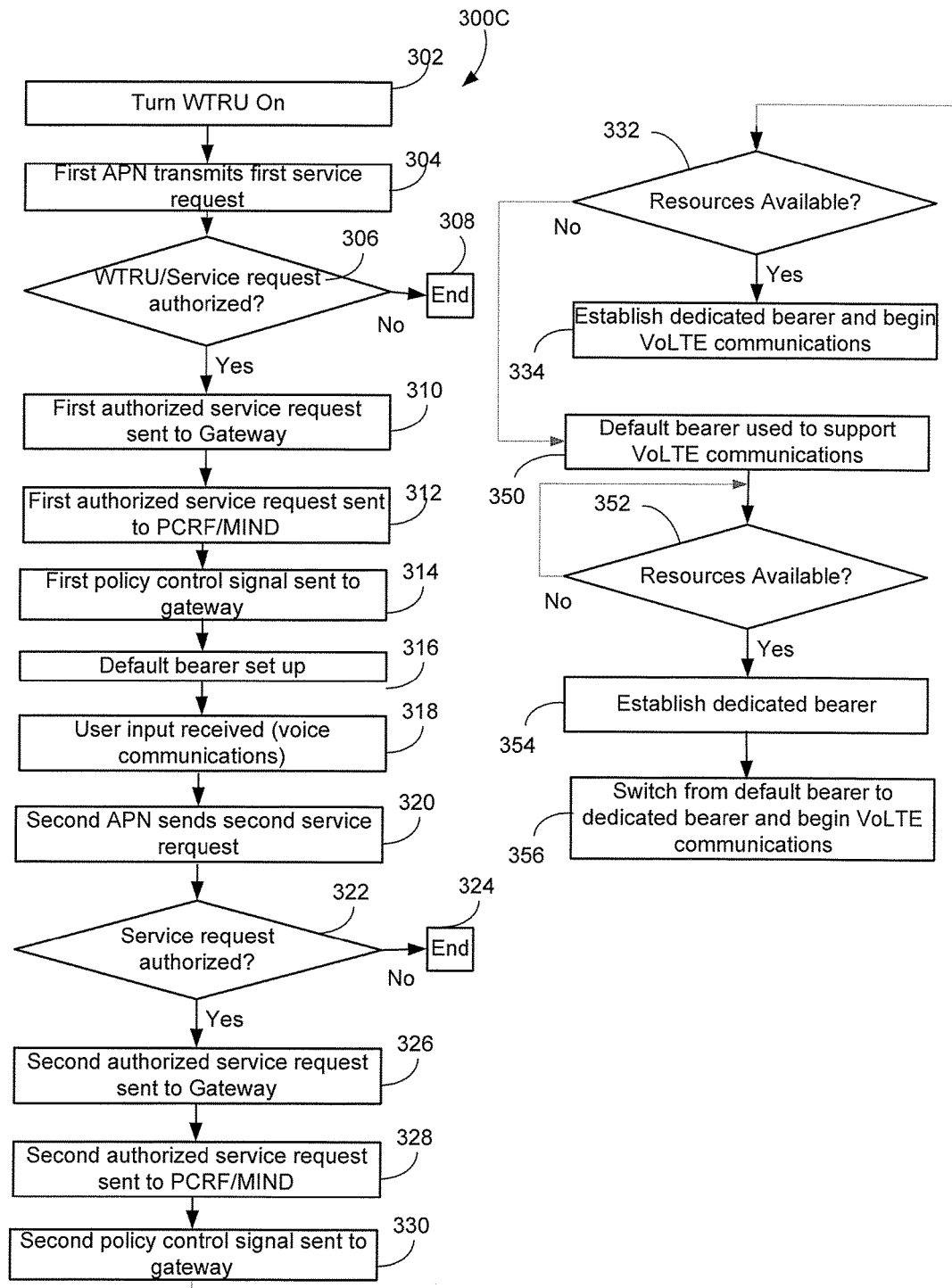

FIG. 3C illustrates another exemplary operation 300C of network 200 according to an embodiment. Blocks 302-334 of operation are described above in connection with FIG. 3A. If, in block 332, the gateway 230 determines that the requested resources are not available to establish a dedicated bearer which satisfies the requests of the second authorized service request 248b and/or the policy control signal 254b, process 300C may continue to block 350. In block 350, gateway 230 may use default bearer 124 to transmit/receive VoLTE communications. Default bearer 124 may be used to transmit VoLTE traffic even though it does not have a high enough QoS to fulfill that of the service request 242b. Accordingly, while the VoLTE communications being transmitted over the default bearer 224 may suffer from poor QoS, the VoLTE communications but will be transmitted/ received successfully. After the default bearer 124 begins supporting VoLTE traffic, operation 300C may continue onto block 352.

In block 352, the gateway 230 may determine if the resources are currently available to establish a bearer which satisfies the requests of the second authorized service request 248b and the policy control signal 254b. If the requested resources are not available when the second authorization request 242b is received, gateway 230 may repeat block 352. If the resources are available, operation 300C may proceed to block 354.

In block 354, the second service request 242b from APN 208 may be granted and the dedicated bearer 220, which fulfills the requests contained within the second service request 242b, may be set up. Dedicated bearer 220 may be established in accordance with the requests contained in the second service request 242b and may be dedicated to the transmission of VoIP communications. Dedicated Bearer 220 may be connected to GBR link 210 and transmit information between WTRU 202 and the wired network 236 that requests a high quality of service (QoS) connection, such as, for example, VoLTE communications. Once dedicated bearer 220 has been set up, the VoLTE communications may be switched from default bearer 224 to dedicated bearer 220 in block 356

In accordance with an embodiment, while the default bearer 124 is being used to transmit VoLTE communications, the QoS of the default bearer 124 may be temporarily improved. For example, once the default bearer 124 begins supporting VoLTE communications, such as in block 340 in process 300B and block 350 in process 300C, gateway 230 may improve the QoS of the default bearer 124 in order to improve the quality of the VoLTE communications passing there through. Once the VoLTE traffic is switched over to a dedicated bearer, such in block 346 of process 300B and block 356 of processes 300C, the QoS of the default bearer 124 may be reduced back down to normal levels by the gateway 230.

In accordance with another embodiment, if default bearer 224 is supporting VoLTE communications because the resources are not available to set up a dedicated bearer, gateway 230 may plan ahead for when the requested resources become available in the future. The gateway 230 may establish such a plan for the future when, for example, the default bearer 124 is supporting VoLTE communications in block 340 in process 300B and block 350 in process 300C prior to the availability of the resources requested to establish a dedicated bearer in block 344 in process 300B and in block 352 in process 300C.

Gateway 230 may plan for the future availability of resources where, for example, the gateway 230 has received multiple VoLTE service requests 242 from one or more WTRUs but does not have the current resources available to grant any of the service requests 242. The gateway 230 may plan for the future by evaluating each service request and establishing an order in which the requests should be granted once the requested resources become available, with the highest priority service requests 242 being granted before lower priority service requests 242. The gateway 320 may also take into account the nature of the VoLTE request when planning for the future. The nature of VoLTE requests may refer to information such as, for example: whether the service request relates to an emergency call, a business call, or a personal call; account information associated with the WTRU (such as, for example, whether the WTRU is associated with a premium vs. standard account); and profile information associated with the WTRU (such as, for example, a user profile of the user of the WTRU). Such information may be stored in, for example, MME 244, HSS 246, PCRF 250, MIND 252, telephone network 236a, IMS domain 136b, and/or the internet (now shown) and accessed by the gateway 230.

While the above description involves a service request 242 for VoLTE communications, it should be appreciated that FIGS. 2 and 3A-3C apply equally to other types of service requests 242 requiring a dedicated bearer. Further, in connection with, for example, blocks 306, 322, 332, 342, and 352, it should be appreciated that the gateway 230 may act alone or in combination with one or more of MME 244, HSS 246, PCRF 250, and MIND 252.

Figure 4:
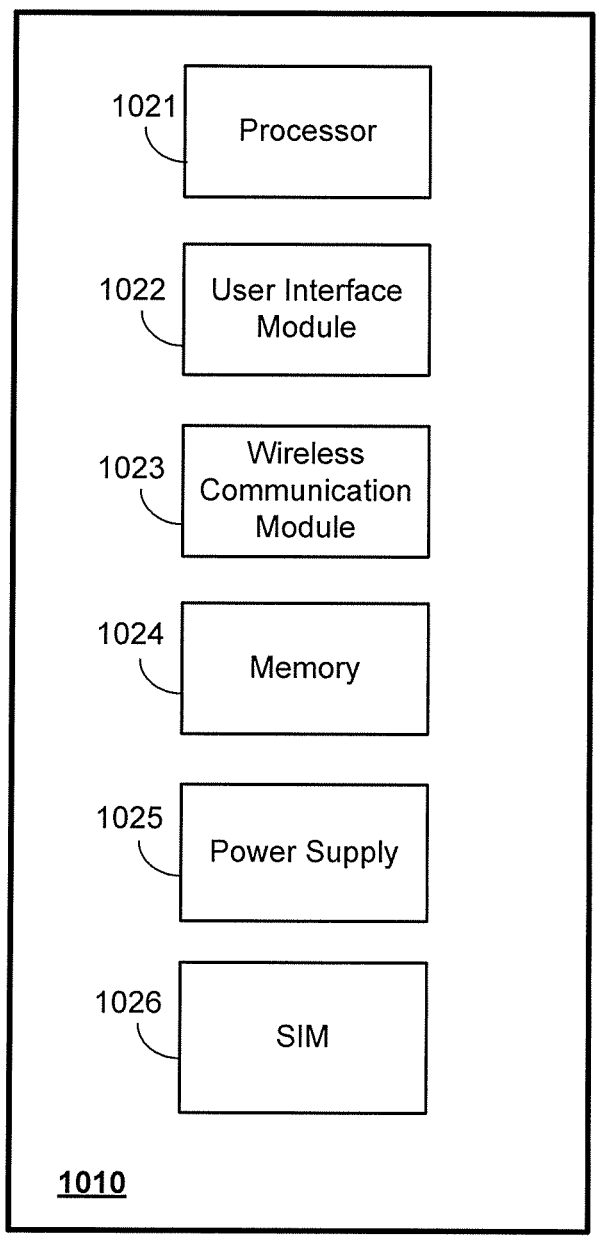
FIG. 4 is a block diagram of a non-limiting exemplary mobile device in which VoLTE methods and systems may be implemented.

FIG. 4 illustrates an example wireless device 1010 that may be used in connection with an embodiment. References will also be made to other figures of the present disclosure as appropriate. For example, mobile devices 102 and 210 may be wireless devices of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to VoLTE methods and systems, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
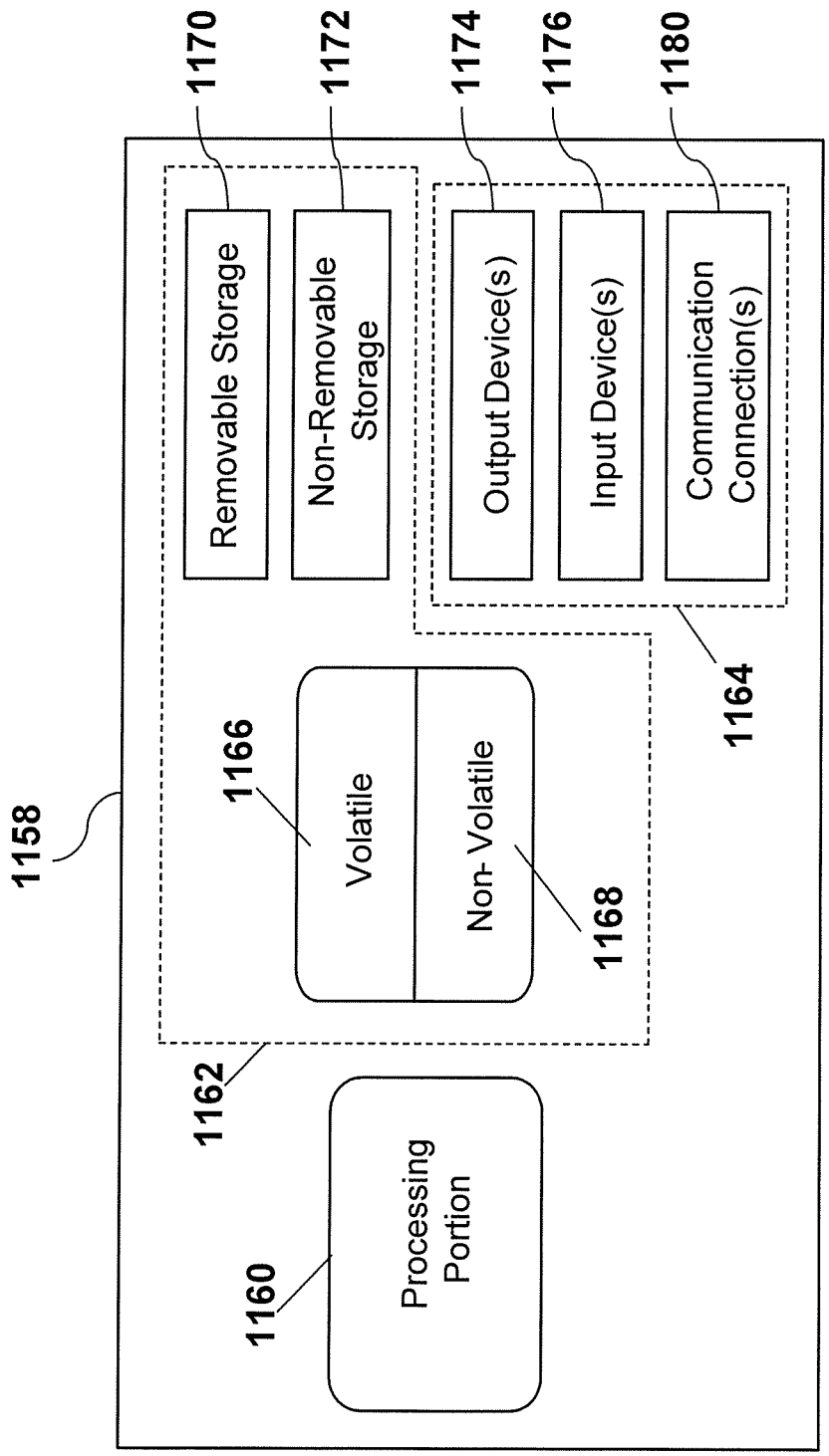
FIG. 5 is a block diagram of a non-limiting exemplary processor in which VoLTE methods and systems may be implemented.

FIG. 5 is a block diagram of an example processor 1158 which may be employed in any of the embodiments described herein, including as one or more components of FIGS. 1A-4, and/or any related equipment, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, transmit and/or receive configuration data, transmit and receive device condition data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing condition and event data, configuration commands, profiles, thresholds, APNs, MNCs, MCCs, service requests, radio resource requests, QoS and/or APN parameters, software for VoLTE, device and link status, condition, and congestion data, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may be tangible storage media that may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how VoLTE methods and systems may be implemented with stationary and non-stationary network structures and architectures. It will be appreciated, however, that VoLTE methods and systems as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, VoLTE methods and systems may be implemented independently of the method of data transport and does not depend on any particular network architecture or underlying protocols.

Figure 6:
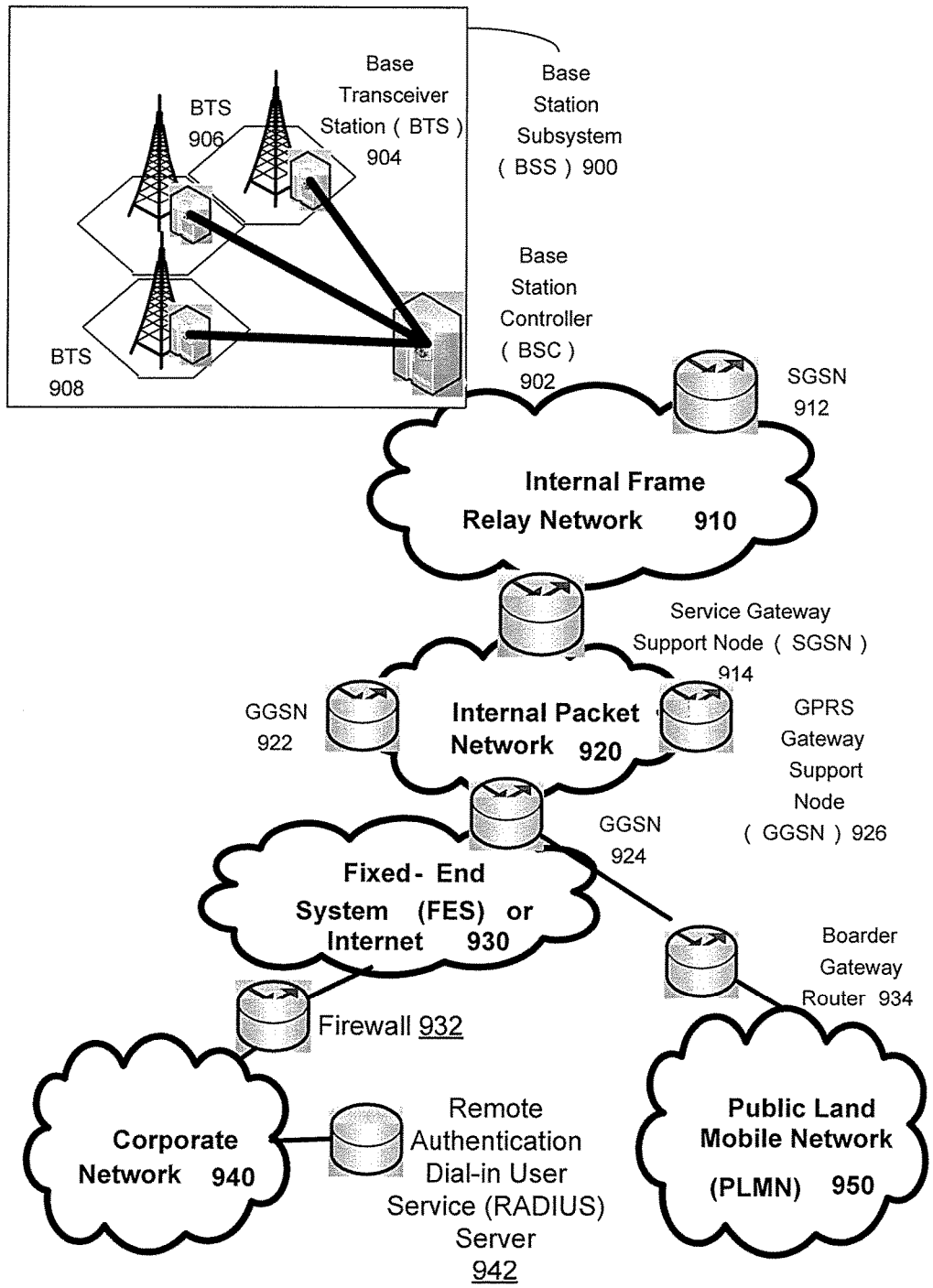
FIG. 6 is a block diagram of a non-limiting exemplary packet-based mobile cellular network environment, such as a GPRS network, in which VoLTE methods and systems may be implemented.

FIG. 6 depicts an overall block diagram of an exemplary packet-based mobile cellular network environment, such as a GPRS network, in which VoLTE systems and methods such as those described herein may be practiced. In an example configuration, any RAN as described herein may be encompassed by or interact with the network environment depicted in FIG. 6. Similarly, mobile devices 102 and 210 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102 and 210) become connected to the wireless network. In exemplary fashion, the packet traffic originating from user devices (e.g., mobile devices 102 and 210) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
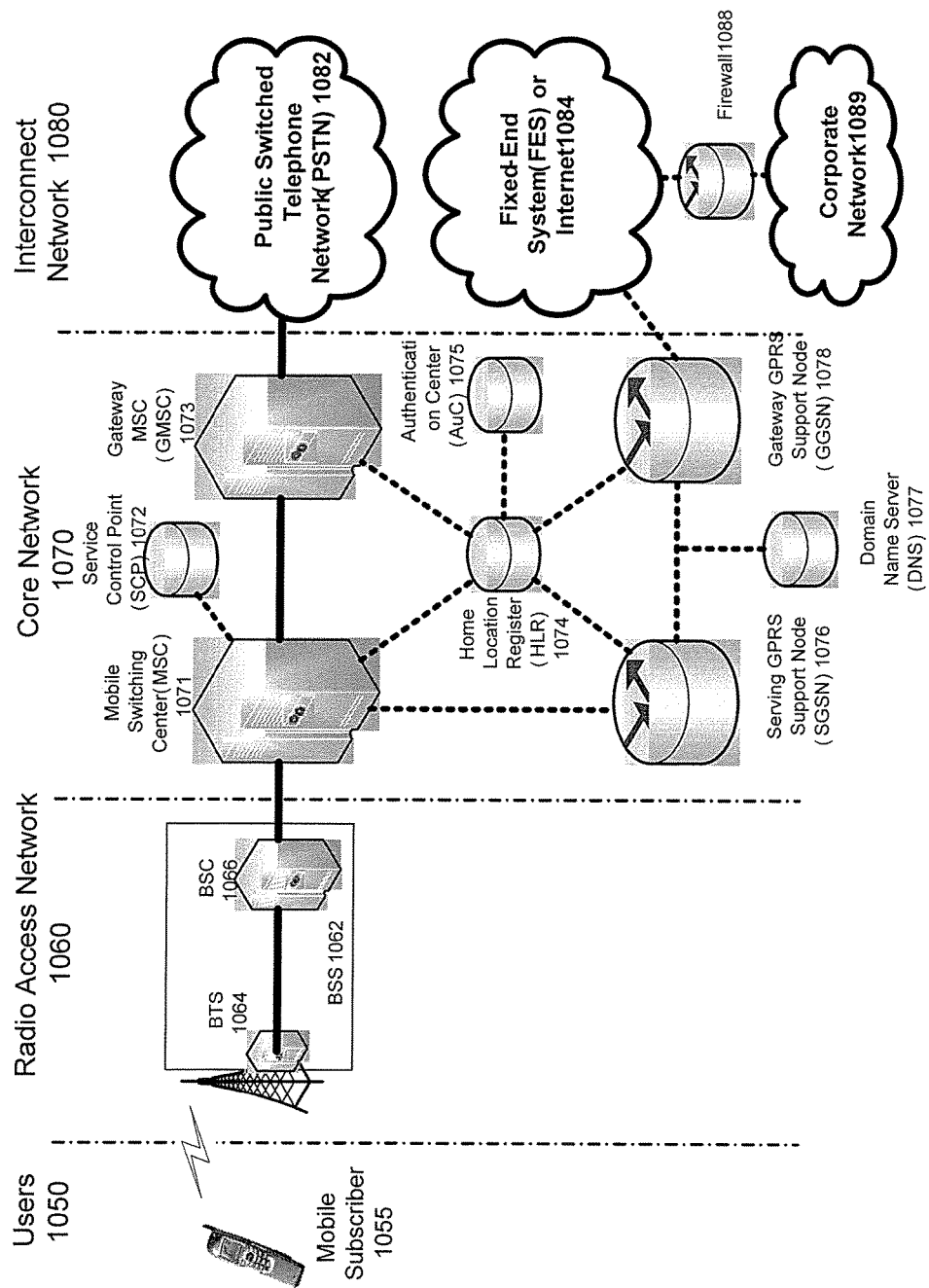
FIG. 7 illustrates a non-limiting exemplary architecture of a typical GPRS network, segmented into four groups, in which VoLTE methods and systems may be implemented.

FIG. 7 illustrates an architecture of a typical GPRS network segmented into four groups: users 1050, radio access network 1060, core network 1070, and interconnect network 1080. Users 1050 may comprise a plurality of end users (although only mobile subscriber 1055 is shown in FIG. 7). In an example embodiment, the device depicted as mobile subscriber 1055 may comprise any of mobile devices 102 and 210. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR/HSS 246 may be a device such as HLR 1074. HLR 1074 may store static information about the subscribers such as the International Mobile Subscriber Identity (IMSI), APN profiles, profiles as disclosed herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102 and 210, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of VoLTE methods and systems such as those described herein may include, but are not limited to, Gateway GPRS Support Node tables, Fixed End System router tables, firewall systems, VPN tunnels, and any number of other network elements as required by the particular digital network.

Figure 8:
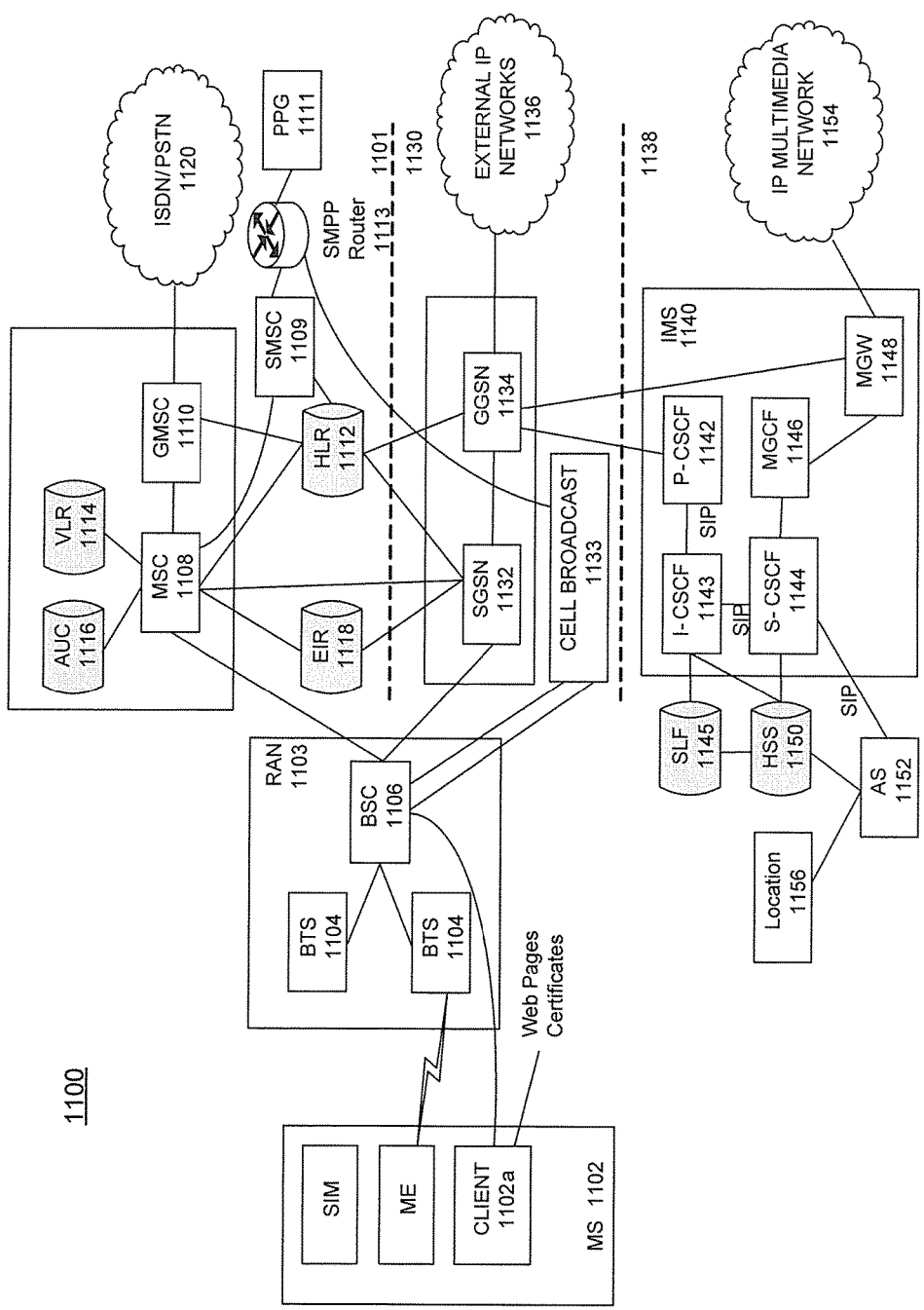
FIG. 8 illustrates a non-limiting alternate block diagram of an exemplary GSM/GPRS/IP multimedia network architecture in which VoLTE methods and systems may be implemented.

FIG. 8 illustrates another exemplary block diagram view of a GSM/GPRS/IP multimedia network architecture 1100 in which the systems and methods for VoLTE methods and systems such as those described herein may be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102 and 210) that is used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 9:
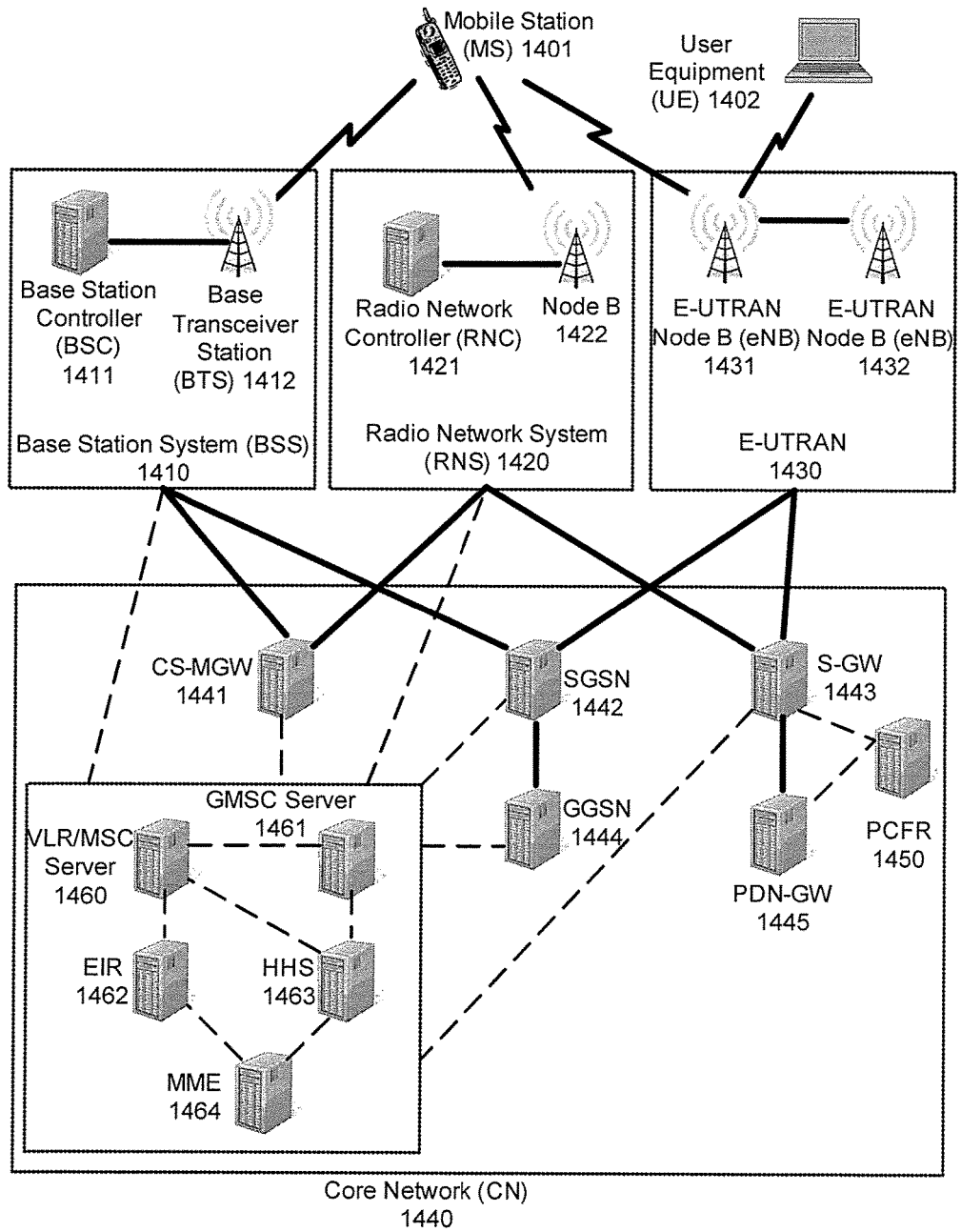
FIG. 9 illustrates a PLMN block diagram view of an example architecture in which VoLTE may be incorporated.

FIG. 9 illustrates a PLMN block diagram view of an example architecture in which VoLTE methods and systems may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of VoLTE methods and systems have been described in connection with various communications devices and computing devices and processors, the underlying concepts can be applied to any communications or computing device, processor, or system capable of implementing VoLTE methods and systems described. The various techniques described herein may be implemented in connection with hardware or software or, where appropriate, with a combination of both. The methods and apparatuses for VoLTE, or certain aspects or portions thereof, can take the form of program code (i.e., instructions) embodied in tangible storage media that is not a signal (i.e., not a transient signal per se, not a propagating signal per se) such as floppy diskettes, CD-ROMs, hard drives, or any other machine-readable storage medium, wherein, when the program code is loaded into and executed by a machine, such as a computer, the machine becomes an apparatus for VoLTE. In the case of program code execution on programmable computers, the computing device may include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for VoLTE may also be practiced via communications embodied in the form of program code that may be transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for VoLTE. When implemented on a general-purpose processor, the program code combines with the processor to provide a unique apparatus that operates to invoke the functionality of VoLTE as described herein. Additionally, any storage techniques used in connection with a VoLTE system may be a combination of hardware and software.

While VoLTE methods and systems have been described in connection with the various embodiments of the various figures, it is to be understood that other similar embodiments may be used or modifications and additions may be made to the described embodiments for performing the same function of VoLTE without deviating therefrom. For example, one skilled in the art will recognize VoLTE as described in the present application may apply to any environment, whether wired or wireless, and may be applied to any number of such devices connected via a communications network and interacting across the network. Therefore, VoLTE methods and systems should not be limited to any single embodiment, but rather should be construed in breadth and scope in accordance with the appended claims.

What is claimed:

1. A system comprising:
    a node; and
    a network device communicatively coupled with the node, the network device comprising:
        a processor; and
        memory coupled with the processor, the memory comprising executable instructions that when executed by the processor cause the processor to effectuate operations comprising:
            establishing a default bearer between the node and the network device, the default bearer being associated with a first Access Point Name (APN) residing on a wireless transmit/receive unit (WTRU), the node wirelessly interfacing with the WTRU, the default bearer having a quality of service;
            transmitting a first communication type between the network device and the node over the default bearer;
            receiving, at the network device, a service request, the service request requesting the establishment of a dedicated bearer for a transmission of a second communication type between the network device and the node, the service request requesting that the dedicated bearer have a quality of service higher than the quality of service of the default bearer, the service request originating from a second APN residing on the WTRU;
            transmitting the second type of communication between the network device and the node over the default bearer;
            establishing the dedicated bearer; and
            switching, after the dedicated bearer is established, the transmission of the second type of communication between the network device and the node from the default bearer to the dedicated bearer.

2. The system of claim 1, wherein the dedicated bearer is established after transmitting the second type of communication between the network device and the node over the default bearer.

3. The system of claim 2, wherein establishing the dedicated bearer further comprises establishing the dedicated bearer when a required network resources are available.

4. The system of claim 1, further operations comprising:
    determining, prior to transmitting the second type of communication between the network device and the node over the default bearer, that a required network resources to establish the dedicated bearer are not available; and
    establishing the dedicated bearer when the required network resources are available.

5. The system of claim 1, further operations comprising:
    improving the quality of service of the default bearer from an initial quality of service to an improved quality of service while the default bearer is transmitting the second type of communication between the network device and the node over the default bearer.

6. The system of claim 1, further operations comprising:
    establishing, at the network device in a network, a second default bearer between the node and the network device, the second default bearer being associated with a third APN residing on a second WTRU, the node wirelessly interfacing with the second WTRU, the second default bearer having a quality of service.

7. The system of claim 6, further operations comprising transmitting the first communication type between the network device and the node over the second default bearer.

8. A method comprising:
    providing a message for a network device, wherein based on the message a default bearer is established between a node and the network device, the default bearer being associated with a first Access Point Name (APN) of a wireless transmit/receive unit (WTRU), the node wirelessly interfacing with the WTRU, the default bearer having a quality of service;
    transmitting a first communication type between the network device and the node over the default bearer;
    providing to the network device a service request, the service request requesting the establishment of a dedicated bearer for a transmission of a second communication type between the network device and the node, the service request requesting that the dedicated bearer have a quality of service higher than the quality of service of the default bearer, the service request originating from a second APN associated with the WTRU;
    transmitting the second type of communication between the network device and the node over the default bearer; and
    after establishing the dedicated bearer, transmitting the second type of communication between the network device and the node from the default bearer to the dedicated bearer.

9. The method of claim 8, wherein the dedicated bearer is established after transmitting the second type of communication between the network device and the node over the default bearer.

10. The method of claim 9, wherein establishing the dedicated bearer further comprises establishing the dedicated bearer when a required network resources are available.

11. The method of claim 8, further comprising:
determining, prior to transmitting the second type of communication between the network device and the node over the default bearer, that a required network resources to establish the dedicated bearer are not available; and
establishing the dedicated bearer when the required network resources are available.

12. The method of claim 8, further comprising:
improving the quality of service of the default bearer from an initial quality of service to an improved quality of service while the default bearer is transmitting the second type of communication between the network device and the node over the default bearer.

13. The method of claim 8, further comprising:
establishing, at the network device in a network, a second default bearer between the node and the network device, the second default bearer being associated with a third APN residing on a second WTRU, the node wirelessly interfacing with the second WTRU, the second default bearer having a quality of service.

14. A node comprising:
a processor; and
memory coupled with the processor, the memory comprising executable instructions that when executed by the processor cause the processor to effectuate operations comprising:
providing a message for a network device, wherein based on the message a default bearer is established between the node and the network device, the default bearer being associated with a first Access Point Name (APN) of a wireless transmit/receive unit (WTRU), the node wirelessly interfacing with the WTRU, the default bearer having a quality of service;
transmitting a first communication type between the network device and the node over the default bearer;
providing to the network device a service request, the service request requesting the establishment of a dedicated bearer for a transmission of a second communication type between the network device and the node, the service request requesting that the dedicated bearer have a quality of service higher than the quality of service of the default bearer, the service request originating from a second APN associated with the WTRU;
transmitting the second type of communication between the network device and the node over the default bearer; and
after establishing a dedicated bearer, transmitting the second type of communication between the network device and the node from the default bearer to the dedicated bearer.

15. The node of claim 14, wherein the dedicated bearer is established after transmitting the second type of communication between the network device and the node over the default bearer.

16. The node of claim 15, wherein establishing the dedicated bearer further comprises establishing the dedicated bearer when a required network resources are available.

17. The node of claim 14, further operations comprising:
determining, prior to transmitting the second type of communication between the network device and the node over the default bearer, that a required network resources to establish the dedicated bearer are not available; and
establishing the dedicated bearer when the required network resources are available.

18. The node of claim 14, further operations comprising:
improving the quality of service of the default bearer from an initial quality of service to an improved quality of service while the default bearer is transmitting the second type of communication between the network device and the node over the default bearer.

19. The node of claim 14, further operations comprising:
establishing, at the network device in a network, a second default bearer between the node and the network device, the second default bearer being associated with a third APN residing on a second WTRU, the node wirelessly interfacing with the second WTRU, the second default bearer having a quality of service.

20. The node of claim 19, further operations comprising transmitting the first communication type between the network device and the node over the second default bearer.

* * * * *